(12) United States Patent
Nishiyama et al.

(10) Patent No.: US 12,111,971 B2
(45) Date of Patent: Oct. 8, 2024

(54) CONTROL DEVICE AND CONTROL METHOD FOR VEHICLE-MOUNTED EQUIPMENT

(71) Applicant: Nissan Motor Co., Ltd., Kanagawa (JP)

(72) Inventors: Jo Nishiyama, Kanagawa (JP); Hirofumi Inoue, Kanagawa (JP); Takehito Teraguchi, Kanagawa (JP); Yu Shikoda, Kanagawa (JP); Shota Okubo, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 775 days.

(21) Appl. No.: 17/057,395

(22) PCT Filed: May 22, 2018

(86) PCT No.: PCT/JP2018/019639
§ 371 (c)(1),
(2) Date: Nov. 20, 2020

(87) PCT Pub. No.: WO2019/224905
PCT Pub. Date: Nov. 28, 2019

(65) Prior Publication Data
US 2021/0206384 A1     Jul. 8, 2021

(51) Int. Cl.
*G06F 3/01* (2006.01)
*B60W 50/00* (2006.01)
(Continued)

(52) U.S. Cl.
CPC .............. *G06F 3/017* (2013.01); *B60W 50/00* (2013.01); *G06F 18/2178* (2023.01); *G06V 20/597* (2022.01); *B60W 2540/227* (2020.02)

(58) Field of Classification Search
CPC .... G06F 3/017; G06F 18/2178; B60W 50/00; B60W 2540/227; G06V 20/597; B60R 16/037
See application file for complete search history.

(56) References Cited

U.S. PATENT DOCUMENTS

2016/0039429 A1*  2/2016  Abou-Nasr ............. G06F 3/017
                                                            382/103
2016/0187992 A1*  6/2016  Yamamoto .............. G06F 3/017
                                                            345/156
(Continued)

FOREIGN PATENT DOCUMENTS

DE      102015108871 A1    12/2015
JP        2006-131031 A     5/2006
(Continued)

OTHER PUBLICATIONS

Machine Translated JP2014078124A (Year: 2014).*

*Primary Examiner* — Anne Marie Antonucci
*Assistant Examiner* — Misa H Nguyen
(74) *Attorney, Agent, or Firm* — Osha Bergman Watanabe & Burton LLP

(57) ABSTRACT

The disclosure includes a first information acquiring device configured to acquire motion information related to a motion of an occupant; a second information acquiring device configured to acquire operation information related to an input operation to a predetermined onboard device, the input operation being based on the motion of the occupant; a memory configured to store the motion information and the operation information in association with each other; a motion detecting device configured to detect the motion of an occupant; and a controller configured to, when the motion information related to the motion of the occupant detected by the motion detecting device is stored in the memory, output command information related to an operation com- (Continued)

mand to the onboard device by referring to the operation information stored in association with the motion information.

7 Claims, 4 Drawing Sheets

(51) Int. Cl.
*G06F 18/21* (2023.01)
*G06V 20/59* (2022.01)

(56) References Cited

U.S. PATENT DOCUMENTS

| | | |
|---|---|---|
| 2017/0267169 A1 | 9/2017 | Fleurence et al. |
| 2019/0071010 A1 | 3/2019 | Fleurence et al. |
| 2019/0283773 A1 | 9/2019 | Mori et al. |

FOREIGN PATENT DOCUMENTS

| | | | | |
|---|---|---|---|---|
| JP | 2007-170898 A | 7/2007 | | |
| JP | 2007-307992 A | 11/2007 | | |
| JP | 2008-287626 A | 11/2008 | | |
| JP | 2009-101927 A | 5/2009 | | |
| JP | 2014078124 A | * 5/2014 | ............... | G06F 3/01 |
| JP | 2017-182531 A | 10/2017 | | |
| JP | 2017-185994 A | 10/2017 | | |
| WO | 2018/016248 A1 | 1/2018 | | |

* cited by examiner (A)

Image of occupant acquired from non-contact sensor (B)

Estimated posture information

Fig. 4

| Learning model number | Vehicle information | | | | | | Operation device information | | Motion | |
|---|---|---|---|---|---|---|---|---|---|---|
| | Occupant | Number of total occupants | Seating position | Date/time | Vehicle speed, temperature, weather | | Operated onboard device | Input operation | Operation before input (between predetermined time before input and input) | Operation after input (between input and predetermined time after input) |
| 1 | A | 2 | Rear seat #2 | Dec. 8 8:00 AM | 40 km/h 5 °C Cloudy | | Illuminator #2 | ON | Record the following items from image data of captured occupant -Motion of line of sight -Motion of hand -Motion of head | Record the following items from image data of captured occupant -Motion of line of sight -Motion of hand -Motion of head |
| 2 | A | 2 | Rear seat #3 | Aug. 9 12:00 PM | 40 km/h 30 °C Fine | | Air conditioner #1 | ON | Ditto | Ditto |
| 3 | B | 2 | Rear seat #1 | Dec. 12 21:00 PM | 40 km/h 5 °C Fine | | Audio player #1 | ON | Ditto | Ditto |

CONTROL DEVICE AND CONTROL METHOD FOR VEHICLE-MOUNTED EQUIPMENT

TECHNICAL FIELD

The present invention relates to an onboard device controller and a control method.

BACKGROUND ART

A control device for a vehicle function is known, which executes the biometric authentication of an occupant thereby to permit the occupant to use the vehicle function (Patent Document 1). When a plurality of occupants gets on the vehicle, a combination of occupants is perceived based on the biometric authentication of each occupant. Then, past setting information for the vehicle function related to the combination (such as the positions of seats, air conditioner temperature, mirror angle, sound volume, and mode (DVD mode or CD mode)) is searched for, and the vehicle function is set based on the extracted setting information.

PRIOR ART DOCUMENT

Patent Document
Patent Document 1
JP2006-131031A
Summary of Invention
Problems to be solved by Invention However, the operation of an onboard device is not only set based on the combination of a plurality of occupants, but also is often caused by the motions and thoughts of the occupants corresponding to various scenes. For example, when an occupant A in the rear seat will read a book, the occupant A may turn on the rear seat light, or when the occupant A will cross his/her legs, the occupant A may move the seat position of the front seat forward. The above conventional control device for a vehicle function has a problem in that the setting of an onboard device corresponding to such a motion of an occupant cannot be automated.

A problem to be solved by the present invention is to provide an onboard device controller and a control method with which the operation of an onboard device can be controlled based on the motion of an occupant.

Means for Solving Problems

The above problem is solved by the present invention comprising:
acquiring motion information related to a motion of an occupant, the motion being a motion of an operation before and after the occupant performs an input operation when the occupant performs the input operation to an onboard device;
acquiring operation information related to an input operation to an onboard device, the input operation being based on the motion of the occupant;
storing the motion information and the operation information in association with each other; and
when detecting the motion of an occupant related to the stored motion information, outputting command information related to an operation command to the onboard device by referring to the operation information stored in association with the motion information.

EFFECT OF INVENTION

The control method and onboard device controller of the present invention can control an operation to the onboard device suitable for various scenes because command information to the onboard device based on the detected motion of the occupant is output by referring to the motion information and operation information of the occupant stored in advance.

BRIEF DESCRIPTION OF DRAWINGS

FIG. 4 is a data sheet illustrating an example of a case in which a learning model is generated in an operation learning device 17 of the onboard device controller 1 of FIG. 1.

MODE(S) FOR CARRYING OUT THE INVENTION

Figure 1:
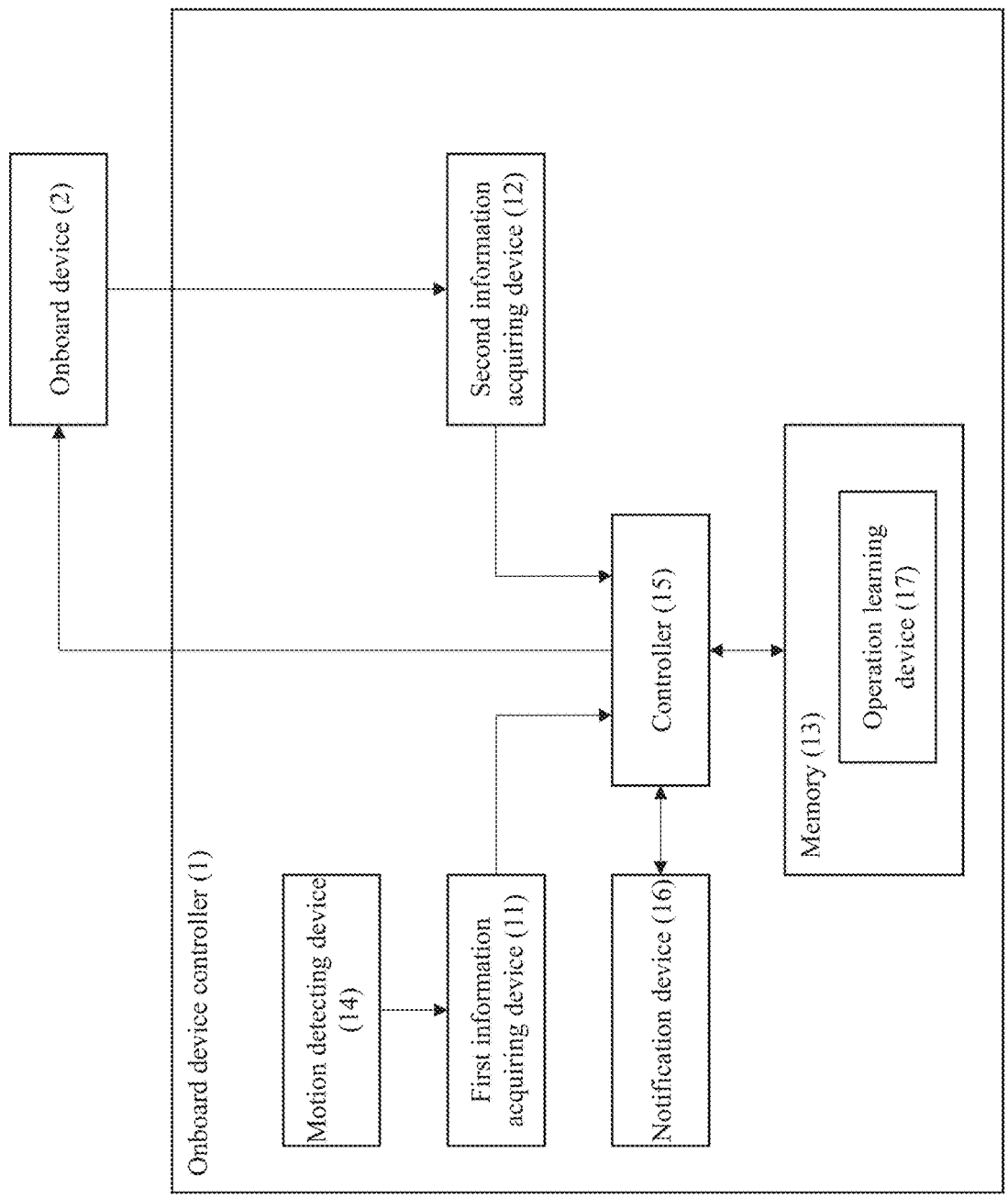
FIG. 1 is a block diagram illustrating an embodiment of the onboard device controller according to the present invention.

Hereinafter, one or more embodiments of the present invention will be described with reference to the drawings. FIG. 1 is a block diagram illustrating an embodiment of the onboard device controller according to the present invention. This onboard device controller may use an embodiment of the control method for an onboard device according to the present invention. Although not particularly limited, the onboard device controller and control method according to one or more embodiments of the present invention operate, for example, as follows: when an occupant in the rear seat will read a book, the motion is detected to turn on the rear seat light; when an occupant in the rear seat will cross his/her legs, the motion is detected to move the seat position of the front seat forward; when an occupant will put off the jacket or open the window, the motion is detected to turn on the air conditioner; when an occupant takes out a portable music player, the motion is detected to read the music data of the portable music player and play the music from an onboard audio player; or when an occupant is reading a book or drinking coffee, the motion is detected to suppress and control the traveling speed of the vehicle.

To this end, the onboard device controller 1 according to one or more embodiments of the present invention includes a first information acquiring device 11 that acquires motion information related to a motion of an occupant, a second information acquiring device 12 that acquires operation information related to an input operation, which is based on the motion of the occupant, to a predetermined onboard device 2, a memory 13 that stores the motion information and the operation information in association with each other, a motion detecting device 14 that detects the motion of an occupant, a controller 15, a notification device 16 that notifies the occupant of an inquiry as to whether or not to output an operation command to the onboard device, and an operation learning device 17. The first information acquiring device 11, the second information acquiring device 12, the memory 13, and the controller 15 may be provided in a specific vehicle or may also be established in a server via a network such as the Internet. When the first information acquiring device 11, the second information acquiring device 12, the memory 13, and the controller 15 are provided in a specific vehicle, the data accumulated in the memory 13 may be transmitted to a server via a network, and a learning model may be generated using the transmitted data together with the data acquired from one or more other vehicles. When the first information acquiring device 11, the second information acquiring device 12, the memory 13, and the controller 15 are established in a server, the data from a plurality of vehicles may be read and learned by the operation learning device 17, which will be described later.

Onboard devices 2 to be controlled by the onboard device controller 1 according to one or more embodiments of the present invention include at least, but are not limited to, an illuminator such as an interior light, an audio player, or an air conditioner. Additionally or alternatively, a seat position adjusting device, a window glass opening/closing device, an angle adjusting device for the rear-view mirror or room mirror, a navigation device, an automated (autonomous) driving control device (including a speed control device or a steering control device), and the like may be controlled. The control content for such an onboard device 2 includes at least a power-on operation or power-off operation as the input operation to the onboard device 2. Additionally or alternatively, the control content may include illuminance adjustment or angle adjustment in the case of an illuminator, sound volume adjustment, music selection adjustment, channel selection, or data reading from another device in the case of an audio player, temperature adjustment, selection of inside/outside air intake, air conditioner ON/OFF, or selection of a blowing mode in the case of an air conditioner, position adjustment of a specific seat in the back-and-forth direction or angle adjustment of a seat back in the case of a seat position adjusting device, opening/closing of a window glass in the case of a window glass opening/closing device, angle adjustment in the case of an angle adjusting device for a mirror, anti-fog heater ON/OFF or anti-glare mirror ON/OFF, the change of a set travel route in the case of a navigation device, speed selection in the case of an automated driving control device, and the like.

Figure 3:
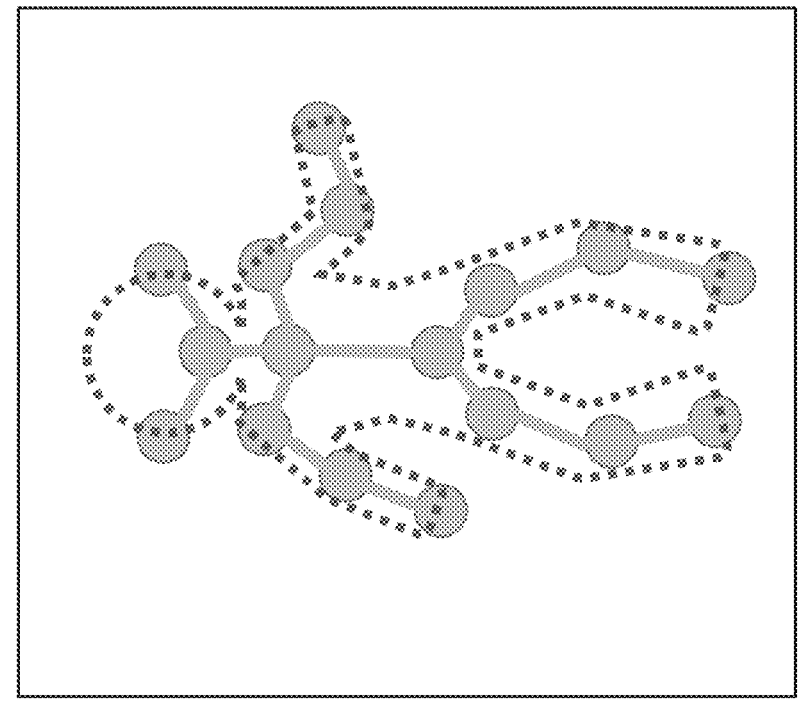
FIG. 3 is a set of diagrams illustrating an example (A) of image data of an occupant acquired by a non-contact sensor such as a camera and an example (B) of posture information of the occupant extracted from the image data of (A).
Figure 3:
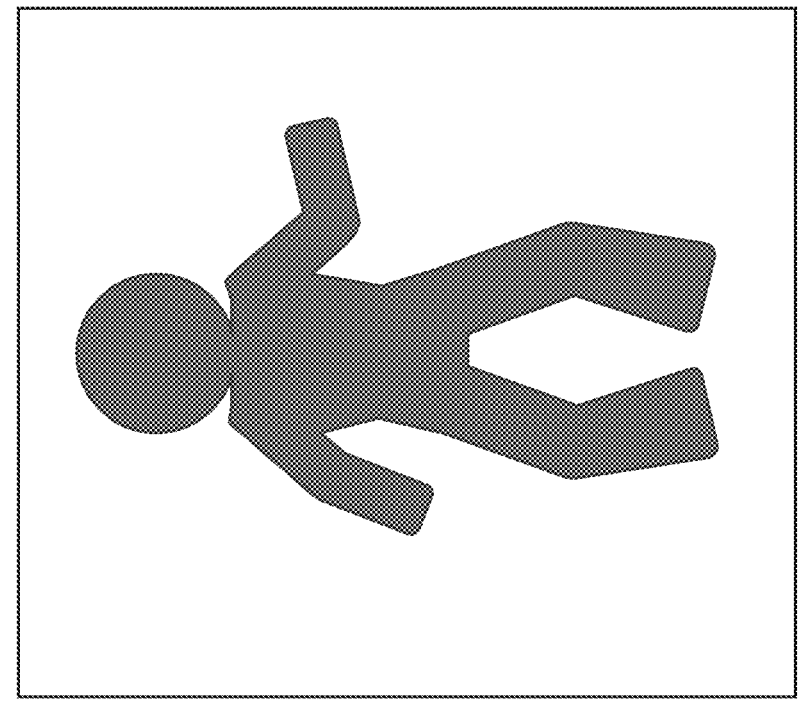

The motion detecting device 14 is composed of a non-contact sensor, such as a distance sensor or a camera that captures an image inside the vehicle, and an electronic circuit installed with a program for analyzing a detection signal detected by the sensor. The motion detecting device 14 detects the motion of an occupant. For example, when cameras are used as the motion detecting device 14, a camera that captures the image of an occupant in the front seat of the vehicle is provided in the vicinity of the room mirror while another camera that captures the image of an occupant in the rear seat is provided on the ceiling, the seat back of a front seat, or the like, and the image data captured by these cameras is image-processed to detect the motion of each occupant. (A) in FIG. 3 is a diagram illustrating an example of the image data of an occupant acquired by a non-contact sensor such as a camera, and (B) in FIG. 3 is a diagram illustrating an example of posture information of the occupant extracted from the image data of (A) in FIG. 3. An image of the occupant at a certain time is acquired by a non-contact sensor such as a camera ((A) in FIG. 3). Image processing is performed on the acquired image to extract the position and/or direction of a part of the occupant (such as the hands, elbows, knees, legs, hip, chest, or face (including eyes)), as illustrated in (B) of FIG. 3, and the posture of the occupant at that time is specified. The memory 13 stores the face data of an occupant and an occupant ID for specifying the individual so that the face data and the occupant ID are associated with each other. On the basis of the face images extracted from the image data of occupants acquired by the camera, the occupant included in the face images is specified by referring to the face data stored in the memory 13, and the specified occupant ID is stored in the memory 13.

The motion of an occupant detected by the motion detecting device 14 is represented by temporal continuous information of the posture of the occupant specified as illustrated in (B) of FIG. 3. That is, from the image data recorded in time series by a non-contact sensor such as a camera, the position and/or direction of a part of the occupant (such as the hands, elbows, knees, legs, hip, chest, or face (including eyes)) including at least the hands, legs, head, or line of sight of the occupant are extracted, and the motion of the occupant is detected from the change in the posture information of the occupant which is temporally continuous. For example, when the legs of the occupant change from an aligned state to a posture in which one leg overlaps the other, it is detected that the occupant performs a motion of crossing the legs. Additionally or alternatively, when the position and direction of the hand, elbow, or face of the occupant change to those represented by the posture information of taking out a book from a bag and reading the book, or in other similar cases, it is detected that the occupant performs a motion of reading the book.

Motions of an occupant detected by the motion detecting device 14 in this way include at least any of a motion before the occupant performs the input operation to the onboard device 2, a motion after the occupant performs the input operation to the onboard device 2, or a motion before and after the occupant performs the input operation to the onboard device 2. For example, when an occupant in the rear seat behind the front passenger seat will cross his/her legs, the occupant operates the seat position adjusting device of the front passenger seat to move the front passenger seat forward and then crosses the legs, crosses the legs and then operates the seat position adjusting device of the front passenger seat to move the front passenger seat forward, or operates the seat position adjusting device of the front passenger seat to move the front passenger seat forward while crossing the legs. Also when an occupant will take out a book from a bag to read the book, the occupant turns on the illuminator, then takes out the book from the bag, and opens the book, takes out the book from the bag, opens the book, and then turns on the illuminator, or takes out the book from the bag, then turns on the illuminator, and opens the book. Thus, motions of an occupant detected by the motion detecting device 14 preferably include at least any of an operation before the occupant performs the input operation to the onboard device 2 such as a seat position adjusting device or an illuminator, an operation after the occupant performs the input operation to the onboard device 2, or an operation before and after the occupant performs the input operation to the onboard device 2.

The first information acquiring device 11 acquires the motion information related to the motion of an occupant detected by the above-described motion detecting device 14 and outputs the acquired motion information to the controller 15. The second information acquiring device 12 acquires, from the onboard device 2, the operation information related to the input operation to a predetermined onboard device 2 and outputs the acquired operation information to the controller 15. The input operation is based on the motion of the occupant detected by the above-described motion detecting device 14. The motion information acquired by the first information acquiring device 11 and the operation information acquired by the second information acquiring device 12 are recognized in association with each other by the controller 15. For example, when an occupant crosses his/her legs and moves the position of the front passenger seat forward, information on crossing the legs is output as the motion information of the occupant from the first information acquiring device 11 to the controller 15, and information on the forward movement of the position of the front passenger seat is output as the operation information from the second information acquiring device 12 to the controller 15. Likewise, when an occupant will take out a book from a bag and turn on the illuminator to read the book, information on taking out the book from the bag to read the book is output as the motion information of the occupant from the first information acquiring device 11 to the controller 15, and information on turning on the illuminator is output as the operation information from the second information acquiring device 12 to the controller 15.

The controller 15 associates the motion information acquired by the first information acquiring device 11 and the operation information acquired by the second information acquiring device 12 with each other and stores this in the memory 13. However, if the notification device 16 to be described later is notified that the user does not accept the registration into the memory 13, the motion information and the operation information may not be stored. The memory 13 stores, for each onboard device 2, the motion information acquired by the first information acquiring device 11 and the operation information acquired by the second information acquiring device 12 in association with each other.

The operation learning device 17 executes a predetermined learning algorithm based on the onboard device 2, the input operation to the onboard device 2, and the motion of an occupant to generate a learning model of the input operation to the onboard device 2 with respect to the motion of the occupant. That is, the motion information acquired by the first information acquiring device 11 and the operation information acquired by the second information acquiring device 12 are used as input values (feature values), and the predetermined learning algorithm is applied to generate the learning model of the input operation to the onboard device 2 with respect to the motion of the occupant. The motion information and the operation information are accumulated in the memory 13 by the controller 15 so as to be associated with each other for each onboard device 2. When data pieces on the onboard devices 2, the input operations to the onboard devices 2, and the motions of occupants are collected for a plurality of vehicles as described above, the learning model of the input operation to an onboard device 2 with respect to the motion of an occupant is obtained using such big data. The operation learning device 17 may be configured as a part of the memory 13 or may also be configured as another component.

In a state in which the learning model of the input operation to the onboard device 2 with respect to the motion of an occupant is generated and stored in the memory 13 including the operation learning device 17, when the motion information related to the motion of the occupant detected by the motion detecting device 14 is stored in the memory 13, the controller 15 refers to the operation information stored in association with the motion information and outputs command information related to an operation command to the onboard device 2. Here, the cases in which the motion information related to the motion of an occupant detected by the motion detecting device 14 is stored in the memory 13 include not only a case in which the motion information detected by the motion detecting device 14 and the motion information stored in the memory 13 are the same but also a case in which they are similar within a predetermined threshold. There are some individual differences in the motions of crossing legs and reading books and other motions of occupants, and it is therefore preferred to set a similarity range within a predetermined threshold in order to absorb an error of the motion information due to such individual differences and recognize the similar motions as the same motion.

The notification device 16 has a device such as a display or a speaker and serves as a communication means and a command means between the onboard device controller 1 and a user. That is, when the controller 15 controls the memory 13 to store the motion information acquired by the first information acquiring device 11 and the operation information acquired by the second information acquiring device 12 which are associated with each other for each onboard device 2, the notification device 16 notifies a user of an inquiry as to whether or not the user accepts that these information items are stored in the memory 13. Then, when the user's reply to the notification is that the user does not accept, the notification device 16 outputs this fact to the controller 15, and the controller 15 does not store the information items in the memory 13, in accordance with the user's reply.

Additionally or alternatively, when the controller 15 refers to the operation information stored in association with the motion information and outputs the command information related to the operation command to the onboard device 2, the notification device 16 notifies a user of an inquiry as to whether or not to output the operation command to the onboard device 2. Then, when the user's reply to the notification is that the user does not accept, the notification device 16 outputs this fact to the controller 15, and the controller 15 does not output the operation command to the onboard device 2, in accordance with the user's reply. The notification device 16 may be omitted if necessary.

When the operation learning device 17 uses the motion information acquired by the first information acquiring device 11 and the operation information acquired by the second information acquiring device 12, which are associated with each other for each onboard device 2, as the input values (feature values) and applies the predetermined learning algorithm to generate the learning model of the input operation to the onboard device 2 with respect to the motion of an occupant, vehicle information may be added as additional input values. Examples of this type of vehicle information include the occupant IDs, number of occupants, seating positions of occupants, current date and time, weather, temperature, vehicle speed, and elapsed time after boarding. The occupant IDs can be detected by face recognition with a camera used as the motion detecting device 14. The number of occupants and the seating positions of the occupants can be detected by image processing with the camera used as the motion detecting device 14. The current date and time and the elapsed time after boarding can be detected by an onboard clock. The weather can be acquired from a weather information providing server via a network. The temperature and vehicle speed can be detected by onboard sensors. By adding the vehicle information to the motions of occupants, it is possible to learn the difference in the operation information due to the difference in the vehicle information even for the same motion of occupants, and more detailed control of an onboard device can therefore be achieved.

FIG. 4 is a data sheet illustrating an example of a case in which the operation learning device 17 generates a learning model. The learning model number represents one unit of data in which the vehicle information, operating device information, and information detected for each motion are associated with one another. For example, the data of learning model number 1 is data in which, under the vehicle information that the occupant whose face is recognized is an occupant A (face-recognized occupant), the number of occupants is two, the seating position is a rear seat #2 (behind the front passenger seat), the date and time is 8:00 AM on December 8, the average vehicle speed is 40 km/h, the temperature is 5° C., and the weather is cloudy, an illuminator #2 is turned on and the motion of line of sight, motion of hand, and motion of head of the occupant A under the above condition are acquired before the input operation (between a predetermined time before the input and the input) and after the input operation (between the input and a predetermined time after the input).

It is assumed that the motion of the occupant A taking out a book from a bag is detected from the motion of line of sight, motion of hand, and motion of head of the occupant A before the input operation, and the motion of the occupant A opening the book to start reading is detected from the motion of line of sight, motion of hand, and motion of head of the occupant A after the input operation.

Likewise, the data of learning model number 2 of FIG. 4 is data in which, under the vehicle information that the occupant whose face is recognized is the occupant A (face-recognized occupant), the number of occupants is two, the seating position is a rear seat #3 (behind the driver seat), the date and time is 12:00 PM on August 9, the average vehicle speed is 40 km/h, the temperature is 30° C., and the weather is fine, an air conditioner #1 for rear seat is turned on and the motion of line of sight, motion of hand, and motion of head of the occupant A under the above condition are acquired before the input operation (between a predetermined time before the input and the input) and after the input operation (between the input and a predetermined time after the input). It is assumed that the motion of the occupant A putting off the jacket is detected from the motion of line of sight, motion of hand, and motion of head of the occupant A before the input operation, and the motion of the occupant A fanning the face with a hand is detected from the motion of line of sight, motion of hand, and motion of head of the occupant A after the input operation.

Figure 2:
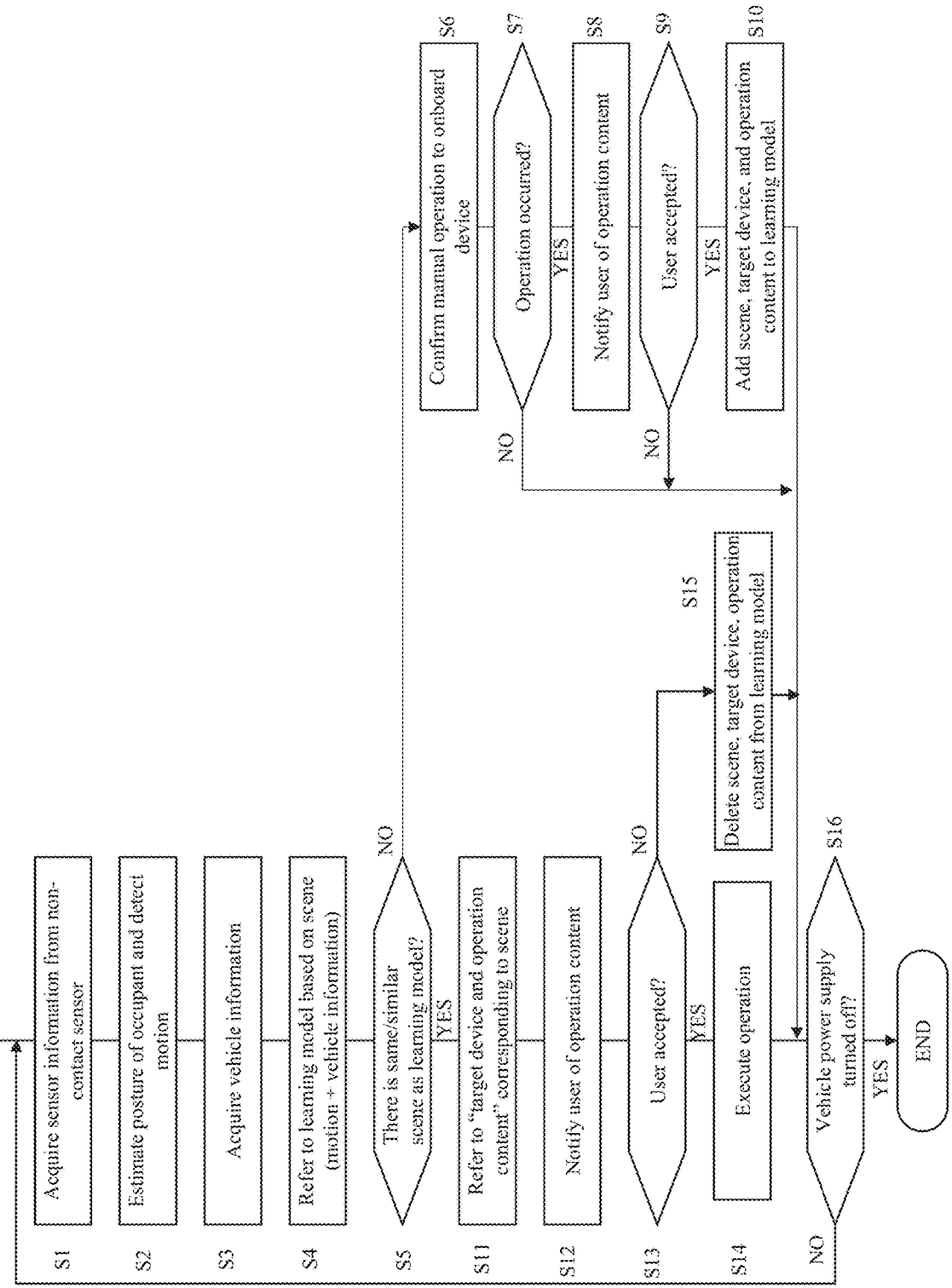
FIG. 2 is a flowchart illustrating an example of a process executed by a controller of the onboard device controller of FIG. 1.

The operation of the onboard device controller 1 according to one or more embodiments of the present invention will then be described with reference to FIG. 2. FIG. 2 is a flowchart illustrating an example of a process executed by the controller 15 of the onboard device controller 1 of FIG. 1. In step S1, sensor information (such as image information captured by a camera) is acquired from a non-contact sensor which is the motion detecting device 14, and in step S2, the motion of an occupant is detected from the time-series image data. On the other hand, in step S3, vehicle information is acquired from various sensors.

In step S4, the learning model generated by the operation learning device 17 of the memory 13 is referred to based on the motion of the occupant detected in step S2 and the vehicle information detected in step S3, and a determination is made in step S5 whether or not the same or similar scene data exists. For example, when the motion of an occupant taking out a book from a bag is detected in step S2 and the vehicle information at that time is stored as the same or similar data as the vehicle information that the occupant whose face is recognized is an occupant A (face-recognized occupant), the number of occupants is two, the seating position is a rear seat #2 (behind the front passenger seat), the date and time is 8:00 AM on December 8, the average vehicle speed is 40 km/h, the temperature is 5° C., and the weather is cloudy as in the learning model number 1 of FIG. 4, the process proceeds to step S11, while when such vehicle information is not stored, the process proceeds to step S6. The similarity range of the vehicle information as used herein may be set such that any of the occupant ID, the number of occupants, the seating position of an occupant, the current date and time, the weather, the temperature, the vehicle speed, and the elapsed time after boarding is the same.

When, in step S5, a determination is made that the same or similar scene data as the motion of an occupant detected in step S2 and the vehicle information detected in step S3 is not stored in the operation learning device 17 of the memory 13, step S5 is followed by step S6, in which a manual operation to the onboard device 2 by an occupant is input to the controller 15 via the second information acquiring device 12. Then, in step S7, a determination is made whether or not an operation to the onboard device 2 has occurred, and when an operation has occurred, the process proceeds to step S8, in which the notification device 16 is notified of the operation content to the onboard device 2. The notification content to the notification device 16 is, for example, "The air conditioner has just been turned on. Do you accept registering this?" Then, along with this notification, the "Yes" and "No" buttons are displayed on the notification device 16 to encourage the user to reply. When, in step S9, the user's reply to the notification of step S8 means acceptance, for example, when the reply is "Yes," step S9 is followed by step S10, in which the memory 13 is controlled to store the motion of the occupant detected in step S2, the vehicle information detected in step S3, and the onboard device 2 and its operation content detected in step S6.

When no manual operation to the onboard device 2 has occurred in step S7, a determination is made that the motion of the occupant detected in step S2 is a motion that is unrelated to the operation to the onboard device 2, and the process proceeds to step S16. Likewise, when a manual operation to the onboard device 2 has occurred in step S7 but the user does not accept it in step S9 (e.g., "No"), a determination is made that the motion of the occupant detected in step S2 is a motion that is unrelated to the operation to the onboard device 2, and the process proceeds to step S16.

Referring again to step S5, when a determination is made that the same or similar scene data as the motion of an occupant detected in step S2 and the vehicle information detected in step S3 is stored in the operation learning device 17 of the memory 13, step S5 is followed by step S11, in which the onboard device 2 as a target stored in the operation learning device 17 of the memory 13 and the operation content for the onboard device 2 are referred to, and in step S12, the notification device 16 is notified of the operation content. The notification content to the notification device 16 is, for example, "Do you accept turning on the air conditioner?" Then, along with this notification, the "Yes" and "No" buttons are displayed on the notification device 16 to encourage the user to reply. When, in step S13, the user's reply to the notification of step S12 means acceptance, for example, when the reply is "Yes," step S13 is followed by step S14, in which the operation is executed (in the above example, the air conditioner is turned on). On the other hand, when the user does not accept in step S13 (e.g., "No"), a determination is made that the operation content to the onboard device 2 extracted in step S11 is not intended by the user, and the process proceeds to step S15, in which the motion of the occupant, the vehicle information, and the onboard device 2 and its operation content stored in the operation learning device 17 of the memory 13 are deleted.

In step S16, a determination is made whether or not the vehicle power supply is OFF, and when ON continues, the process returns to step S1, while when it is OFF, the process is concluded.

As described above, the vehicle information acquired in step S3 is not necessarily an essential configuration; therefore, step S3 may be omitted and the above-described process may be executed based on the information excluding the vehicle information in the subsequent steps S4 to S16. Moreover, as described above, the notification device 16 can be omitted if necessary. When the notification device 16 is omitted, steps S12 and S13 may be omitted so that the operation content extracted in step S11 is executed directly in step S14. Likewise, when the notification device 16 is omitted, steps S8 and S9 may be omitted so that the manual operation content detected in step S6 is added directly in step S10.

As described above, according to the onboard device controller 1 and control method of one or more embodiments of the present invention, an operation to an onboard device suitable for various scenes can be controlled because the command information to an onboard device 2 based on the detected motion of an occupant is output by referring to the motion information and the operation information of the occupant stored in advance. In particular, such operation control is not uniquely determined by the occupant IDs or the combination of a plurality of occupants, but is caused by the motions and thoughts of the occupants regardless of the occupant IDs and the like, and the operation control is therefore more suitable for various scenes.

According to the onboard device controller 1 and control method of one or more embodiments of the present invention, the motion information includes information relating to the motion of at least the hand, leg, head, or line of sight of an occupant, and the motion is recorded according to time. Each of these elements is particularly strongly related to the operation of an onboard device 2, and the relationship between the motion information and the operation information is therefore more enhanced.

According to the onboard device controller 1 and control method of one or more embodiments of the present invention, onboard devices 2 include at least an illuminator, an audio player, or an air conditioner, and the input operation to an onboard device 2 includes at least a power-on operation for the onboard device. The onboard device 2 and its power-on operation are particularly strongly related to the motion of an occupant, and the relationship between the motion information and the operation information is therefore more enhanced.

According to the onboard device controller 1 and control method of one or more embodiments of the present invention, motions of an occupant include at least an operation before the occupant performs the input operation, an operation after the occupant performs the input operation, or an operation before and after the occupant performs the input operation, and it is therefore possible to respond to the motion of the occupant in any period before and after the operation to the onboard device 2.

According to the onboard device controller 1 and control method of one or more embodiments of the present invention, the notification device 16 is further provided, which notifies an occupant of an inquiry as to whether or not to output the operation command to an onboard device 2, and the notification device 16 is notified of the command information output from the controller 15; therefore, a malfunction can be avoided.

According to the onboard device controller 1 and control method of one or more embodiments of the present invention, the controller 15 outputs the command information to an onboard device 2, and the operation to the onboard device 2 can therefore be automated without complicated procedures such as a reply via the notification device 16.

According to the onboard device controller 1 and control method of one or more embodiments of the present invention, the operation learning device 17 is provided, which executes a predetermined learning algorithm based on the input operation to an onboard device 2 and the motion of an occupant to generate a learning model of the input operation to the onboard device 2 with respect to the motion of the occupant, and it is therefore possible to generate a personal learning model suitable for the actual usage situation in addition to the default learning model.

According to the onboard device controller 1 and control method of one or more embodiments of the present invention, when the controller 15 receives a command not to perform an operation defined by the command information from an occupant within a predetermined period after outputting the command information to an onboard device 2, the controller 15 does not register in the learning model or modifies the learning model; therefore, the registration to the learning model is avoided or modified in response to the proposal of an inappropriate operation, and as a result, an inappropriate operation is prevented from being proposed again.

According to the onboard device controller 1 and control method of one or more embodiments of the present invention, the controller 15 inquires of an occupant whether or not the learning model should be added or changed, and an inappropriate learning model can therefore be prevented from being added or changed.

DESCRIPTION OF REFERENCE NUMERALS

1 Onboard device controller
11 First information acquiring device
12 Second information acquiring device
13 Memory
14 Motion detecting device (motion sensor)
15 Controller
16 Notification device
17 Operation learning device
2 Onboard device

The invention claimed is:
1. An onboard device controller comprising:
 a first information acquiring device configured to acquire motion information related to a motion of an occupant, the motion being a motion of an operation before and after the occupant performs an input operation when the occupant performs the input operation to an onboard device;
 a second information acquiring device configured to acquire operation information related to the input operation to the onboard device, the input operation being based on the motion of the occupant;
 a memory configured to store the motion information and the operation information in association with each other;
 a motion detecting device configured to detect the motion of an occupant;
 a controller configured to, when the motion information related to the motion of the occupant detected by the motion detecting device is stored in the memory, output command information related to an operation com- mand to the onboard device by referring to the operation information stored in association with the motion information; and an operation learning device configured to execute a predetermined learning algorithm based on the onboard device, the input operation to the onboard device, and the motion of the occupant to generate a learning model of the input operation to the onboard device with respect to the motion of the occupant, wherein the controller is configured to:
  determine whether or not a scene that is same or similar to a scene defined by the motion information and vehicle information acquired from an onboard sensor is stored in the learning model;
  when it is determined that the scene that is same or similar to the scene defined by the motion information and the vehicle information is stored in the learning model, notify the occupant of a content of the input operation corresponding to the motion information;
  inquire of the occupant whether or not the content of the input operation corresponding to the motion information should be added to the learning model; and
  when adding the content of the input operation corresponding to the motion information to the learning model is accepted by the occupant, add the motion information and the content of the input operation corresponding to the motion information to the learning model, and
wherein the motion detecting device comprises a non-contact sensor and an electronic circuit installed with a program for analyzing a detection signal detected by the non-contact sensor.

2. The onboard device controller according to claim 1, wherein the motion information includes information relating to the motion of at least a hand, a leg, a head, or a line of sight of the occupant, the motion being recorded according to time.

3. The onboard device controller according to claim 1, wherein
  the onboard device includes at least an illuminator, an audio player, or an air conditioner, and
  the input operation includes at least a power-on operation for the onboard device.

4. The onboard device controller according to claim 1, further comprising
  a notification device configured to notify the occupant of an inquiry as to whether or not to output the operation command to the onboard device,
  wherein the command information output from the controller is a notification to the notification device.

5. The onboard device controller according to claim 1, wherein the controller outputs the command information to the onboard device.

6. The onboard device controller according to claim 1, wherein when the controller receives a command not to perform an operation defined by the command information from the occupant within a predetermined period after outputting the command information to the onboard device, the controller does not register in the learning model or modifies the learning model.

7. A control method for controlling operation information related to an input operation to a predetermined onboard device by using a controller, the method comprising:
  acquiring motion information related to a motion of an occupant, the motion being a motion of an operation before and after the occupant performs an input operation when the occupant performs the input operation to the onboard device;
  acquiring operation information related to the input operation to the onboard device, the input operation being based on the motion of the occupant;
  storing the motion information and the operation information in association with each other;
  when detecting the motion of an occupant related to the stored motion information using a motion detecting device which comprises a non-contact sensor and an electronic circuit installed with a program for analyzing a detection signal detected by the non-contact sensor, outputting command information related to an operation command to the onboard device by referring to the operation information stored in association with the motion information;
  executing a predetermined learning algorithm based on the onboard device, the input operation to the onboard device, and the motion of the occupant to generate a learning model of the input operation to the onboard device with respect to the motion of the occupant;
  determining whether or not a scene that is same or similar to a scene defined by the motion information and vehicle information acquired from an onboard sensor is stored in the learning model;
  when it is determined that the scene that is same or similar to the scene defined by the motion information and the vehicle information is stored in the learning model, notifying the occupant of a content of the input operation corresponding to the motion information;
  inquiring of the occupant whether or not the content of the input operation corresponding to the motion information should be added to the learning model; and
  when adding the content of the input operation corresponding to the motion information to the learning model is accepted by the occupant, adding the motion information and the content of the input operation corresponding to the motion information to the learning model.

* * * * *